March 14, 1933.  H. F. VICKERS  1,901,067

MACHINE FOR CUTTING METAL BARS AND THE LIKE

Filed Aug. 25, 1930

Inventor
HARRY F. VICKERS
By W. H. Cadwell
His Attorney

Patented Mar. 14, 1933

1,901,067

UNITED STATES PATENT OFFICE

HARRY F. VICKERS, OF DETROIT, MICHIGAN

MACHINE FOR CUTTING METAL BARS AND THE LIKE

Application filed August 25, 1930. Serial No. 477,620.

This invention relates to a machine for cutting metal bars, rods, etc., and relates more particularly to a hydraulically actuated machine for cutting metal bars and like parts.

It is an object of the invention to provide a simple, practical, and effective hydraulically actuated bar cracker or machine for cutting metal bars, and the like.

Another object of the invention is to provide a machine for utting bars and like objects that is entirely hydraulic and that is simple and convenient to operate.

It is another object of the invention to provide a machine for cutting bars that embodies improved hydraulically actuated means for feeding the work or bars into the machine.

It is another object of the invention to provide a machine for cutting metal bars in which the parts are of sturdy construction so as to be dependable in operation and are simple and inexpensive of manufacture.

It is a further object of the invention to provide a machine for cutting metal bars in which one of the shearing dies is removably mounted so that it may be replaced with dies for acting on bars of various sizes and configurations to adapt the machine for cutting bars and like objects of various sizes and configurations.

Figure 1:
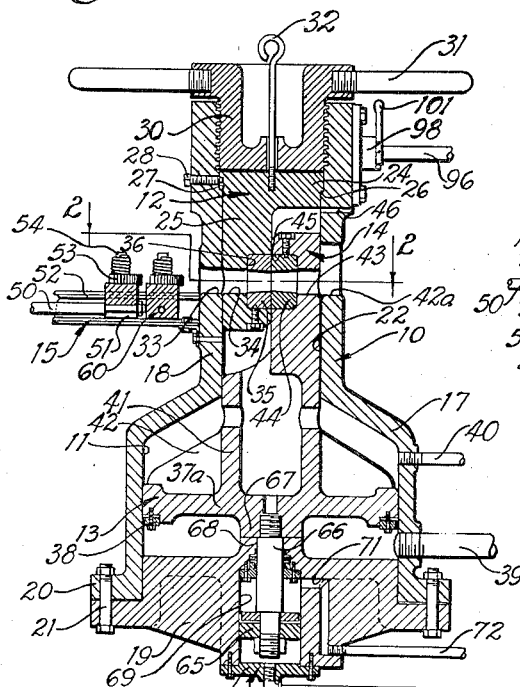
Figure 2:
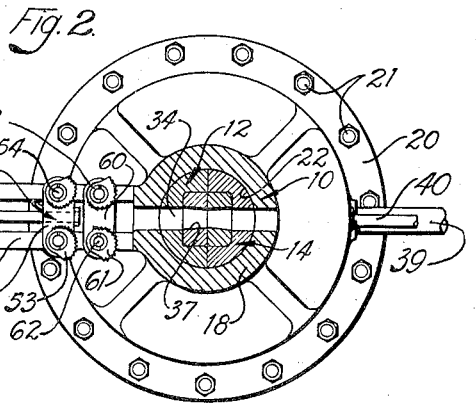
Figure 3:
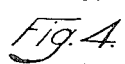
Figure 3:
Figure 3:
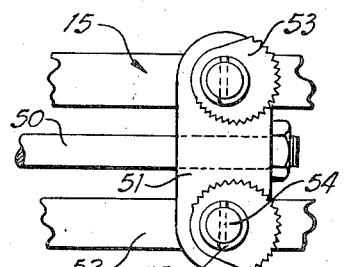
Figure 4:
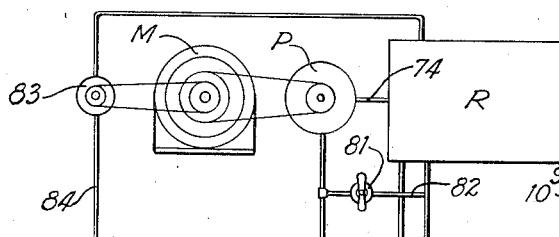
Figure 5:
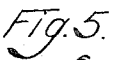
Figure 5:
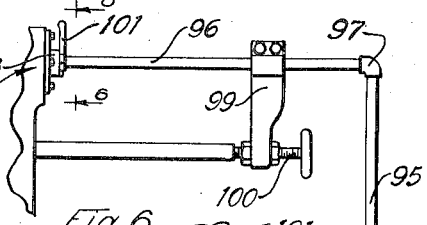
Figure 6:
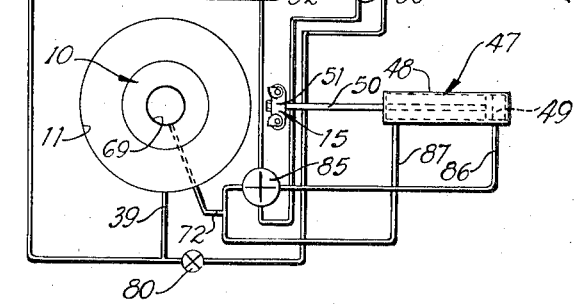
Figure 6:
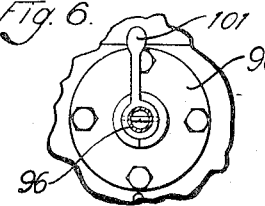

Other objects and features of the invention will be best and more fully understood from the following detailed description of a typical form and application of the invention, throughout which description reference is had to the accompanying drawing, in which:

Fig. 1 is a vertical detailed sectional view of the machine illustrating the parts in the normal or unactuated position. Fig. 2 is a transverse detailed sectional view taken substantially as indicated by line 2—2 on Fig. 1. Fig. 3 is an enlarged detailed sectional view of a portion of the means for feeding the work into the machine. Fig. 4 is a diagrammatic view of the machine and suitable means for supplying fluid under pressure to the machine. Fig. 5 is a reduced view of the stop means embodied in the invention, and Fig. 6 is an enlarged vertical detailed sectional view taken as indicated by line 6—6 on Fig. 5.

The machine provided by this invention includes, generally, a body 10 having a cylinder opening 11, a replaceable die block 12 in the body 10, a plunger or piston 13 operable in the cylinder opening 11 and carrying a die block 14 for cooperation with the die block 12, means 15 for feeding work to a position to be acted upon by the die blocks 12 and 14, and means 16 for returning the piston 13 to a normal position after actuation of the machine.

The body 10 is cylindrical in its general configuration and is an elongated member having a portion 17 of comparatively large diameter which is provided with the cylinder opening 11, and a reduced portion 18. The body 10 may be vertically disposed and arranged so that the portion 17 is at its lower end. The cylinder opening 11 in the lower portion 17 of the body is provided to slidably carry the piston 13 and is closed at its lower end by a head 19. The body 10 and head 19 may be provided with flanges 20 connected by suitable bolts 21. The upper reduced portion 18 of the body is tubular having an opening 22 communicating with the cylinder opening 11. The upper portion 18 forms a guide barrel for the die blocks 12 and 14.

The die block 12 is detachably or removably mounted in the opening 22 of the guide barrel portion 18. The die block 12 includes an upper part 24 and a lower or downwardly projecting part 25. The part 24 of the die block 12 is cylindrical and closes the upper end of the opening 22. A downwardly facing shoulder 26 is provided on the part 24 to seat against a shoulder 27 in the opening 22 to support the die block in the opening. The die block 12 may be held against rotational movement in the opening 22 by a screw 28 threaded through an opening in the wall of the body 10 and engaging the part 24. A clamping plug or head 30 is screw threaded into the upper end of the opening 22 to retain the die block 12 in the opening. The head 30 engages or clamps against the outer end of the part 24 to effectively retain the shoulder 26 in engagement with the shoulder 27. Handles 31 may be provided at the upper end of the plug 30 to facilitate the handling of the plug. A lifting stem 32 projects upwardly from the die block 12 through an opening in the head 30.

The part 25 of the die block is semi-circular in cross sectional configuration. The outer or curved side of the part 25 is arranged against the wall of the opening 22, while the flat inner side of the part 25 is diametric relative to the opening 22. An opening 33 is provided in the walls of the reduced portion 18 of the body and a transverse opening 34 is provided in the part 25 of the die block in register with the opening 33. The openings 33 and 34 are provided to receive or pass the work or bars to be cut. A die or insert 35 is detachably mounted in a recess 36 in the flat inner side of the part 25. The die 35 is provided with an opening 37 registering with the opening 34. The die 35 is formed of a hard material such as tempered steel, or the like. The outer edge of the die 35 is preferably flush with the flat inner side of the part 25.

The piston 13 is mounted for reciprocation in the opening 11 of the body 10. The piston 13 may include an integral body 37$^a$ and suitable sealing means for sealing with the walls of the opening 11. In the particular case illustrated a suitable sealing ring 38 is provided at the periphery of the body 37 to slidably seal with the walls of the opening 11. Fluid under pressure may be delivered to the outer or lower end of the cylinder opening 11 by a conduit 39 threaded into an opening through the wall of the body 10. A fluid discharge conduit 40 may communicate with the upper end of the cylinder opening 11 to permit the discharge of fluid trapped in the upper portion of the opening when the piston is operated.

The die block 14 is carried by the piston 13 and is slidable in the opening 22 of the upper portion 18 of the body. The die block 14 may be integral with the piston 13 and may be connected with the piston by a tubular connecting portion 41. Suitable reinforcing ribs 42 may extend between the portion 41 and the inner or upper side of the piston body 37$^a$. The die block 14 is substantially semi-circular and is arranged so that it has a segmental or flat side slidably engaging the flat side of the part 25 of the block 12. The flat inner sides of the die blocks 12 and 14 cooperate to prevent rotation of the block 14. A longitudinally elongated opening 42$^a$ is provided in the walls of the portion 18 of the body. The lower end of the opening 42$^a$ is in diametric alignment with the lower end of the opening 33. A transverse opening 43 is provided in the die block 14 to register with the opening 42$^a$. A die 44 having an opening registering with the opening 43 is removably mounted in a recess 45 in the inner side of the die block 14. The die 44 may be similar to the die 35 and is adapted to cooperate with the die 35 to cut or sheer an object arranged in the openings 34 and 43 upon actuation of the piston 13. In practice the work passing openings of the dies 35 and 43 may converge toward the engaging inner faces of the blocks 12 and 14. A port 46 may be provided in the portion 18 of the body to communicate with the opening 22 above the die block 14 to permit fluid to be discharged from the upper portion of the opening 22 upon actuation of the piston 13.

The means 15 for feeding the work into the openings 34 and 43 of the die blocks is in the form of a hydraulic means and includes a cylinder and piston mechanism 47. The present invention is not particularly concerned with the specific details of the mechanism 47, and in Fig. 4 of the drawings the mechanism 47 is illustrated diagrammatically as including a cylinder 48 and a piston 49 slidable in the cylinder. The piston 49 carries or operates a rod 50. The means 15 includes a work carrying member 51 mounted at the end of the rod 50 and slidably carried on spaced horizontally disposed rails 52. The rails 52 may be attached to the portion 18 of the body adjacent the lower edge of the opening 33. The member 51 is slidably operated along the rails 52 by the rod 50. Spaced grips 53 are provided at the upper side of the member 51. The grips 53 are rotatably or pivotally carried on upwardly projecting pins 54. The grips 53 are provided with cam or eccentric faces for engaging the work. The eccentric faces of the grips 53 may be roughened or provided with teeth to effectively grip the work upon movement of the member 51 inwardly along the rails 52.

The grips 53 are formed and mounted so that they rotate inwardly upon movement of the member 51 toward the body to bring the eccentric faces into effective engagement with the work or bar.

In accordance with the invention means is provided for normally yieldingly holding the grips 53 in a rotative position where their eccentric faces are in position to grip the work. Torsion springs 55 are arranged on the pins 54 to yieldingly retain the grips 53 in a position to grip the work. It will be obvious how movement of the member 51 toward the body 10 to feed a bar into the machine causes the members 53 to be pivoted in a direction to bring the cam faces into gripping engagement with the bar. Upon outward movement of the members 51 the grips 53 tend to pivot in the opposite direction so that the eccentric faces of the grips are released from the bar.

The invention embodies means for positively preventing outward movement of the work upon outward actuation of the work carrying member 51. A block 60 is stationarily mounted on the rails 52 adjacent the body 10. The block 60 carries two spaced grips 61 similar to the grips 53. The grips 61 are mounted on pins 62 on the member 60 and torsional springs 63 may be provided to yieldingly retain the grips in rotative positions where their eccentric faces are in gripping engagement with the work. Upon inward movement of the work the grips 61 are pivoted or rotated so that their cam faces do not grip the work and upon outward movement of the member 61 causing outward movement of a bar arranged between the grips 61, the grips rotate in an opposite direction so that their eccentric faces grip the work to prevent its further outward movement.

A stop means may be provided to stop the movement of the work as it is fed into the machine to definitely and accurately position the work so that it will be cut at the proper point. The stop means is preferably located at the discharge side of the body to positively limit the passage of the work through the opening 42$^a$ prior to the actuation of the machine. In the particular case illustrated, the stop means includes a vertical standard 95 and a horizontal carrier 96. The standard 95 is spaced some distance from the body 10 and the carrier extends from the stand to the body. The carrier 96 is rotatable, having its outer end rotatably carried by a fitting 97 on the standard and its inner end rotatably supported by a socket bracket 98 on the body 10. The carrier is parallel to the central longitudinal axis of the openings 33 and 34 and is spaced above the opening 42$^a$. A stop 99 is adjustably fixed on the carrier. The stop 99 normally projects downward from the carrier so that its lower end part is in line with the opening 42$^a$. A stop screw 100 may be provided on the lower end of the stop and is adapted to be engaged by the end of the work. It will be apparent how the work may be positively stopped at any desired point by adjusting the stop 99 longitudinally of the carrier and/or by adjusting the screw 100. After the bar or work has been cut the carrier 96 may be rotated or pivoted to swing the stop 99 out of line with the work. A suitable lever or handle 101 may be provided on the carrier 96. In practice, the stop may be swung upwardly to permit the cut piece of work to be ejected from the machine when the next portion of the work is fed into the machine, and may then be swung down to limit the movement of the said next portion of the work.

The means 16 for returning the piston 13 to its down or normal position after actuation is in the form of a cylinder and piston means and includes a piston 65 carried on a rod 66 projecting from the piston 13. The rod 66 may project outwardly or downwardly from the end of a central hub 67 on the lower side of the piston 13. The rod 66 is slidable in an opening in an inwardly extending projection 68 on the inner side of the head 19. The piston 65 is carried at the lower end of the rod 66 and is slidable in a cylinder opening 69 provided in the head 19. A suitable head 70 may close the lower end of the opening 69. The piston 65 is mounted so that it is in the upper end of the opening 69 when the piston 13 is in the up or actuated position. A port 71 communicates with the upper end of the cylinder opening 69. Fluid under pressure may be delivered to the port 71 by a conduit 72. A conduit 73 may communicate with the lower end of the cylinder opening 69. The hub 67 is adapted to engage the projection 68 to limit the downward movement of the piston 13. The hub 67 supports the cylinder 13 in the opening 11 so that the opening in the die block 44 is in register with the opening in the die block 35.

In Fig. 4 of the drawing I have illustrated in a diagrammatic manner the machine provided by the present invention and suitable means for developing and controlling fluid pressure for actuating the machine. A motor M may be employed to operate a pump P to draw fluid from a reservoir R through a conduit 74. The pump P delivers or passes fluid to a line 75 which extends to a point adjacent the body 10. The line 75 discharges into the reservoir R. The conduit 39 communicating with the lower end of the cylinder 11 connects with the conduit 75. A suitable control or cut-off valve 80 is provided in the line 75 at its reservoir end. The valve 80 may be closed to cause fluid pressure developed by the pump P to be delivered directly to the cylinder opening 11. A relief valve 81 may be provided in a by-pass line 82 to by-pass fluid past the valve 80.

The motor M may operate a second pump 83 which passes or discharges fluid through a line 84. A four-way valve 85 is provided in the line 84 adjacent the body 10. The valve 85 is provided to control the passage of fluid from the conduit 84 to conduits 86 and 87 communicating with opposite ends of the cylinder 48 of the work feeding means 15. The valve 85 also may be operated to pass fluid from the conduit 84 to a conduit 90 discharging into the reservoir R. A by-pass 91 may connect the conduits 84 and 90, and a suitable relief valve 92 may be provided in the by-pass 91. The conduit 72 for passing fluid under pressure into the cylinder opening 69 is connected with the conduit 87 communicating with the inner end of the cylinder 48.

It is believed that the operation of the device provided by the present invention will be readily apparent from the foregoing detailed description. A bar or like object may be fed into the openings 34 and 43 by operating the valve 85 to pass fluid through the conduit 86 into the outer end of the cylinder 48. The inward movement of the work is positively limited by the stop 99. Upon the work being arranged in the desired position for the cut, the valve 80 may be closed to cause fluid pressure developed by the pump P to be passed through the conduit 39 into the lower end of the cylinder 11. Fluid under pressure discharged into the lower end of the cylinder 11 forces the piston 13 upwardly to cause the die block 14 to move upwardly relative to the block 12 so that the bar arranged in the openings 43 and 34 is sheared by the dies. Upon the valve 80 being closed the pressure on the piston 13 builds up or increases to an amount sufficient to break the work, and upon the breaking or shearing of the work, immediately momentarily decreases. Immediately upon cutting of the bar the valve 80 may be opened. As the pressure on the system is reduced at this time, the valve 80 is extremely easy to operate. The valve 80 may be a comparatively inexpensive unbalanced valve as it is operated when the pressure on the system is reduced. When it is desired to return the piston 13 to the normal position and to feed another portion of the bar into the machine, the valve 85 may be operated so that fluid under pressure will be passed into the line 87. Fluid under pressure passed into the line 87 is delivered to the cylinder opening 69 by the conduit 72 to cause downward movement of the pistons 65 and 13. The line 86 passes fluid under pressure to the outer end of the cylinder 48 to cause inward movement of the feeding rod 50. Fluid under pressure admitted into the conduit 87 acts to operate the means 15 and the means 47 in synchronism.

It is to be noted that the invention provides a simple and effective machine for cutting or shearing bars, and the like. The die block 12 may be quickly and easily replaced when desired and die blocks carrying dies and having work passing openings of various sizes may be arranged in the opening 22. The construction is particularly simple and strong. The work feeding means 11 is operable to effectively feed the work into the machine. The stroke of the piston 49 may be regulated to provide for the feeding of the desired amount of material into the machine. It is to be noted that there is very little pressure on the system when the valve 80 is open.

Having described only a typical preferred form of my invention, I do not wish to limit myself to the specific details set forth, but wish to reserve to myself any changes or variations that may appear to those skilled in the art or fall within the scope of the following claims.

Having described my invention, I claim:

1. A machine of the character described including, a body having a cylinder opening, a stationary die block in the body, a piston in the cylinder operable by fluid pressure, cylinder and piston means for returning the piston after actuation, a die block carried by the piston, there being an opening in the stationary die block and an opening in the die block carried by the piston in register with the opening in the stationary die block, and means for feeding work into the openings, said means including a member shiftable toward and away from the die blocks, a grip on the member operable to grip an object upon movement of the member toward the die blocks, and cylinder and piston means for shifting the member, and a control for the two cylinder and piston means whereby they operate in synchronism during the returning of the piston.

2. A machine of the character described including, a body having a cylinder opening, a piston in the cylinder opening, a guide barrel on the body, a stationary die block in the guide barrel having an opening, a die block carried by the piston to cooperate with the stationary die block and having an opening in register with the opening in the stationary die block when the piston is in an unactuated position, means for supplying fluid under pressure to the cylinder opening to actuate the piston, and means for returning the piston to the unactuated position after actuation, said last-mentioned means including a piston carried by the first-mentioned piston and operable in a cylinder opening in the said body.

3. A machine of the character described including, a body having a cylinder opening, a piston in the cylinder opening, a guide barrel on the body, a stationary die block in the guide barrel having an opening, a die block carried by the piston to cooperate with the stationary die block and having an opening in register with the opening in the stationary die block when the piston is in an unactuated position, means for supplying fluid under pressure to the cylinder opening to actuate the piston, and means for returning the piston to the unactuated position after actuation, said last-mentioned means including, a cylinder in the said body, a piston operable in the last mentioned cylinder and connected with the first-mentioned piston, and means for supplying fluid under pressure to the said last mentioned cylinder.

4. In a machine of the character described, two die blocks having openings in register, fluid pressure means for actuating one block to move the openings out of register, fluid pressure means for returning the said die block to a position where the openings are in register, fluid pressure actuated means for feeding an object into the openings when in register, and a single valve for controlling the two last mentioned means.

5. In a machine of the character described, two die blocks having openings in register, fluid pressure means for actuating one block to move the openings out of register, fluid pressure means for returning the said die block to a position where the openings are in register, fluid pressure actuated means for feeding an object into the openings when in register, and means whereby the means for returning the die block and the means for feeding the object into the openings are actuated in synchronism.

6. In a machine of the character described, two die blocks having openings in register, fluid pressure means for actuating one block to move the openings out of register, fluid pressure means for returning said die block to a position where the openings are in register, fluid pressure actuated means for feeding an object into the openings when in register, and a fluid pressure interconnection between the two last mentioned means whereby they operate in synchronism during the return stroke of the said die block.

7. In a machine of the character described, two die blocks having openings in register, fluid pressure means for actuating one block to move the openings out of register, fluid pressure means for returning said die block to a position where the openings are in register, fluid pressure actuated means for feeding an object into the openings when in register, a fluid pressure interconnection between the two last mentioned means whereby they operate in synchronism during the return stroke of the said die block, and a single source of actuating fluid pressure for the means for actuating the die block, the means for returning the said die block, and the means for feeding the object into the openings.

In witness that I claim the foregoing I have hereunto subscribed my name this 13th day of August, 1930.

HARRY F. VICKERS.